(12) United States Patent
Gregory

(10) Patent No.: US 6,273,310 B1
(45) Date of Patent: Aug. 14, 2001

(54) PORTABLE LAPTOP COMPUTER WORKSTATION

(76) Inventor: Frederick C. Gregory, 43264 Camino Caruna, Temecula, CA (US) 92592

( * ) Notice: Subject to any disclaimer, the term of this patent is extended or adjusted under 35 U.S.C. 154(b) by 0 days.

(21) Appl. No.: 09/497,599

(22) Filed: Feb. 3, 2000

Related U.S. Application Data

(63) Continuation of application No. 09/159,981, filed on Sep. 24, 1998, now Pat. No. 6,032,840.

(51) Int. Cl.[7] ........................................................ B60R 7/00
(52) U.S. Cl. .......................... 224/275; 108/44; 224/277; 224/282; 224/929
(58) Field of Search .................................. 224/275, 277, 224/282, 929; 108/44, 45

(56) References Cited

U.S. PATENT DOCUMENTS

| | | | |
|---|---|---|---|
| 4,909,159 | * | 3/1990 | Gonsoulin ................................ 108/44 |
| 5,092,507 | * | 3/1992 | Szablak et al. ........................ 224/275 |
| 5,551,616 | * | 9/1996 | Stitt et al. .............................. 224/275 |
| 5,881,934 | * | 3/1999 | Hung ..................................... 224/275 |
| 5,973,917 | * | 10/1999 | White ................................. 224/275 X |

* cited by examiner

*Primary Examiner*—Stephen K. Cronin
*Assistant Examiner*—Maerena W. Brevard
(74) *Attorney, Agent, or Firm*—Loyal McKinley Hanson

(57) ABSTRACT

A laptop computer workstation accessory for an automobile includes a portable case adapted to be transported manually by the driver and placed in an automobile intermediate the driver seat and the passenger seat. The case includes a lower portion with a pivotal laptop computer support structure on which to mount a laptop computer with hook-and-loop fabric fastener, and a lockable upper portion pivotally connected to the lower portion for movement between a closed position in which the upper portion covers the laptop computer support structure and an open position in which it exposes the laptop computer support structure to the driver. The upper portion is adapted to hold a pad of writing paper and the lower portion includes a moveable printer support structure behind a moveable side panel on the passenger side. One embodiment includes a carrier harness with a shoulder strap arrangement for use in manually transporting the accessory to and from the automobile.

7 Claims, 5 Drawing Sheets

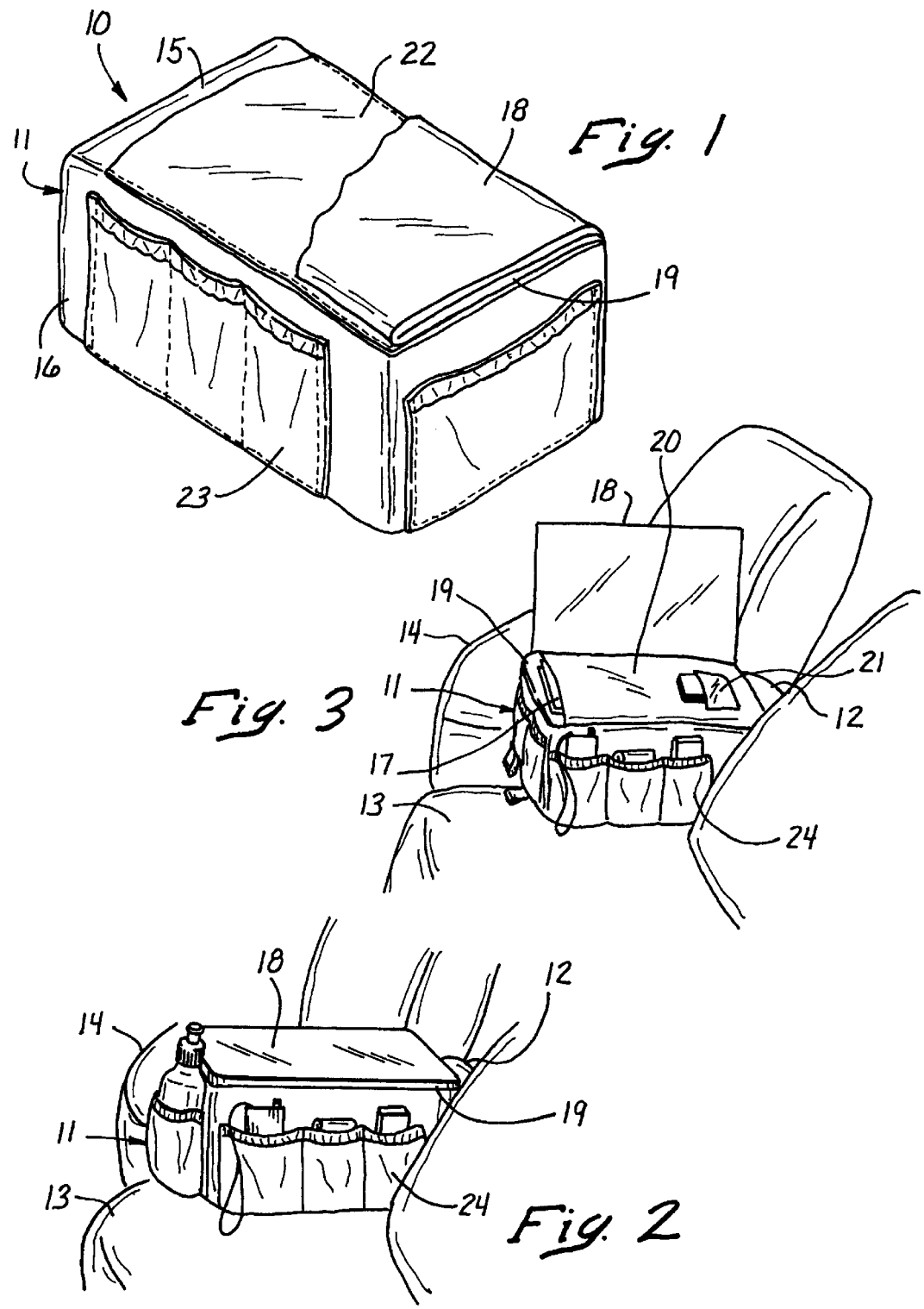

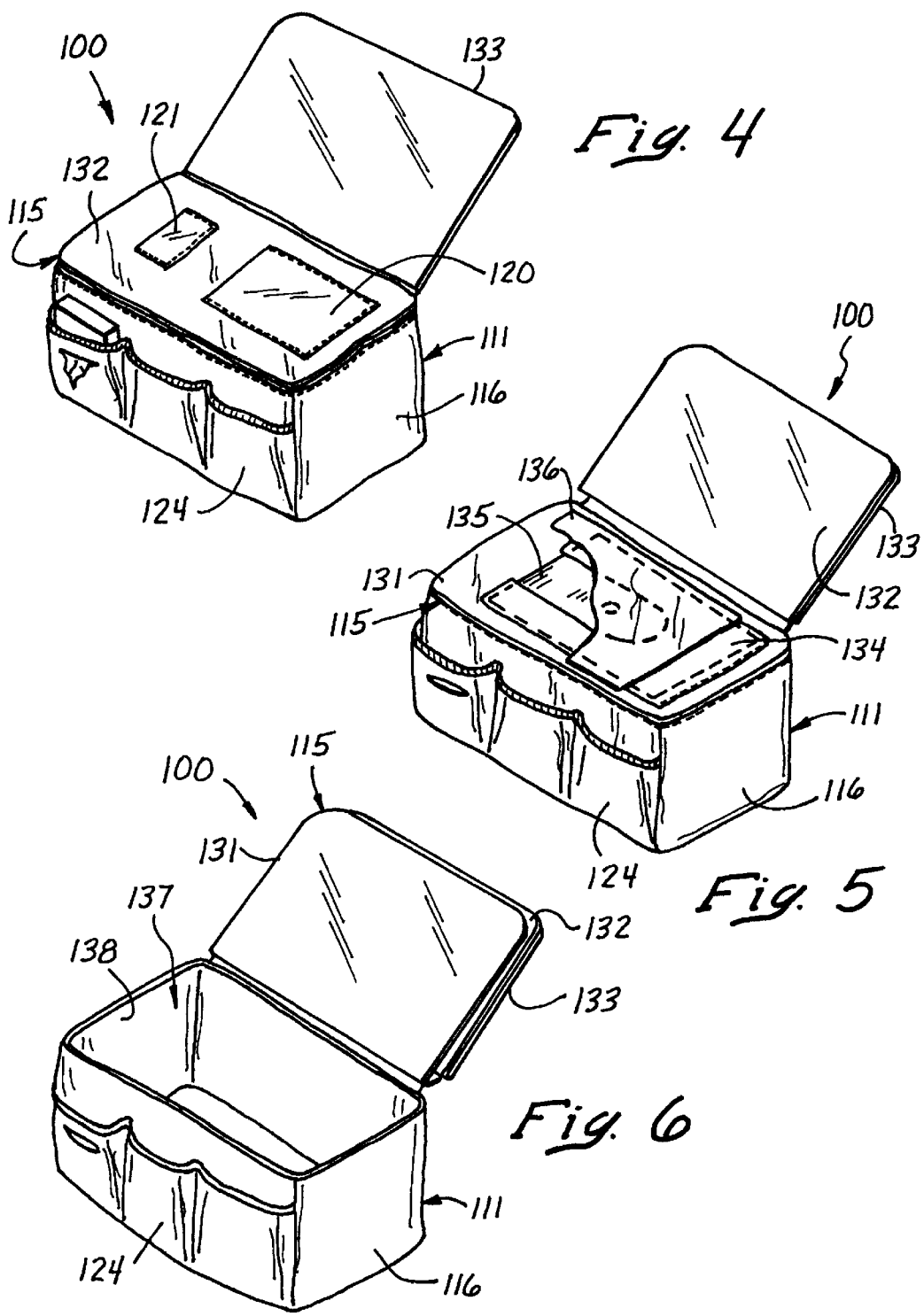

PORTABLE LAPTOP COMPUTER WORKSTATION

CROSS-REFERENCE TO RELATED APPLICATION

This application is a continuation in part of U.S. patent application Ser. No. 09/159,981 filed Sep. 24, 1998, now U.S. Pat. No. 6,032,840 issued on Mar. 7, 2000.

BACKGROUND OF THE INVENTION

1. Technical Field

This invention relates generally to automotive and computer accessories, and more particularly to a portable laptop computer workstation adapted for use in a vehicle by the driver.

2. Description of Related Art

The vehicle armrests and vehicle consoles of interest in the parent application, of which this application is a continuation in part (Ser. No. 09/159,981), are structures located intermediate the left and right front seats of an automobile for passenger comfort, convenience, and safety. Some include a beverage container holder. Others are outfitted with a change holder, cassette holder, storage compartment, and so forth.

Although they can be somewhat handy, existing armrest and console structures can also be somewhat complicated, expensive, and limited in functionality. Thus, a need exists for improved accessories of this type. Vehicle manufacturers and owners seek better designs and some way to conveniently and inexpensively retrofit existing vehicles.

SUMMARY OF THE INVENTION

The parent application (Ser. No. 09/159,981) addresses the concerns outlined above by providing an accessory for an automobile that fits on an armrest, console, or auxiliary box where it pivotally holds and selectively covers a laptop computer. A top portion rests atop the armrest, console, or box and holds a pad of paper on a movable panel. A side portion extends downwardly alongside the armrest where it provides one or more pockets for articles, including, for example, a beverage container, pair of eye glasses, mobile telephone, pencil, pen, tape recorder, calculator, camera, wallet, and so forth. The accessory also includes a pivotal support for a laptop computer, and an auxiliary box may be used to support the valet intermediate backseat passengers as a dummy armrest structure that also serves as a cooler.

This continuation-in-part application describes and claims an additional embodiment that functions as a portable laptop computer workstation suitable for use by a driver in the driver's seat (i.e., the front seat on the left side of the automobile). To paraphrase some of the more precise language appearing in the claims, a portable laptop computer workstation constructed according to the invention includes a case adapted to hold a laptop computer upon the front seat of an automobile in a position located to the right of a driver occupying a driver's seat in the automobile. A lower portion of the case includes a support structure adapted to hold the laptop computer pivotally in order to enable the driver to pivot the laptop computer relative to the lower portion of the case to a desired operating position of the laptop computer on support structure. An upper portion of the case is hinged to the lower portion in order to enable the driver to move the upper portion between a closed position in which the upper portion covers the laptop computer on the support structure and an open position in which the upper portion exposes the laptop computer on the support structure to the driver.

The upper portion of the illustrated embodiment is adapted to hold a pad of writing paper so that the pad of writing paper faces downwardly toward the laptop computer on the support structure when the upper portion is in the closed position and so that the pad of writing paper faces upwardly and rearwardly when the upper portion is in the open position. In addition, the upper portion an upwardly opening storage compartment and the upper portion includes a movable cover over the storage compartment. Means are included for locking the upper portion of the case in the closed position, and the lower portion of the case defines a compartment adapted to hold a computer printer. A carrier harness with shoulder straps facilitates transportation of the accessory to and from the automobile.

Thus, the embodiment described in the instant continuation-in-part application extends the inventive concepts described in the parent application to provide a functional laptop computer workstation that is particularly suited for use in patrol cars and emergency vehicles in addition to its intended use in civilian vehicles. The following illustrative drawings and detailed description make the foregoing and other objects, features, and advantages of the invention more apparent.

BRIEF DESCRIPTION OF THE DRAWINGS

FIG. 1 of the drawings is an isometric top, front, and left side view of a vehicle accessory or "valet" constructed according to the invention described in the parent application, with portions broken away to expose the reinforcing panel in the top;

FIG. 2 is a reduced isometric view showing the valet installed over an existing automobile armrest structure;

FIG. 3 is an isometric view similar to FIG. 2 in which the upper leaf is open to expose the pad holder;

FIG. 4 is an isometric view of a second embodiment of a valet constructed according to the invention that fits on the armrest structure but is illustrated on an auxiliary box for use intermediate the left and right backseat positions;

FIG. 5 is an isometric view of the second valet embodiment with the pad holder second leaf raised to expose a laptop computer tray on the first leaf;

FIG. 6 is an isometric view of the second valet embodiment with the laptop computer holder first leaf raised to expose the interior of the auxiliary box on which the second valet embodiment is installed;

DESCRIPTION OF THE PREFERRED EMBODIMENTS

Figure 7:
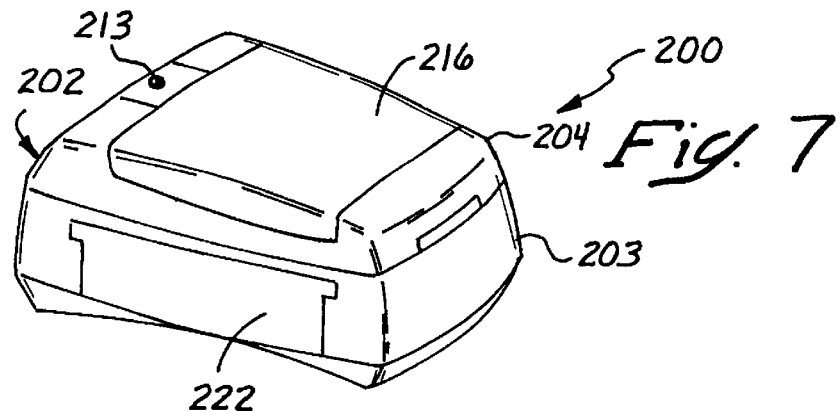
FIG. 7 is an isometric view of a portable laptop computer workstation constructed according to the invention described in the instant continuation-in-part application, taken from the passenger's side.

The description of the preferred embodiments begins with a description of the vehicle armrest/console valets shown in FIGS. 1–6 of the drawings as set forth in the parent application (Ser. No. 09/159,981). A portable laptop computer workstation constructed according to the invention of this continuation-in-part application is then described with reference to FIGS. 7–12. A reader already familiar with the specification and FIGS. 1–6 of the parent application may proceed directly to the description of the portable laptop computer workstation.

Vehicle Armrest/Console Valet

First considering first FIGS. 1–3. They show an accessory 10 constructed according to the invention described in the parent application. The accessory 10 includes a device 11 having a size and shape adapted to rest upon and cover an automobile armrest structure 12 that is disposed intermediate a driver seat 13 and a passenger seat 14 of the automobile. The armrest structure 12 may take any of various known forms, including a single armrest structure that opens to expose a storage compartment within it, for example, or the side-by-side combination of individual driver seat and passenger seat armrests. It typically measures about eighteen to twenty inches long, six to ten inches wide, and eight to ten inches high, although those dimensions may vary without departing from the inventive concepts disclosed.

The device 11 is sized and shape accordingly so that it fits over the arm-rest structure 12 to rest upon the armrest structure 12.

The device 11 includes a top portion 15 and a side portion 16 (FIG. 1). The top portion 15 has a size and shape adapted to rest atop the armrest structure 12, as depicted in FIGS. 2 and 3, and to hold a pad of paper 17 (FIG. 3). The illustrated top portion 15 is rectangularly shaped, measuring about twelve inches long by about eight inches wide. It is configured something like a conventional pad holder available from a stationery store. An upper leaf 18 closes like the cover of a book over a lower leaf 19. The lower leaf 19 includes a forwardly opening pocket arrangement 20 in which the pad of paper 17 is placed. Typically, just a cardboard back of the pad of paper 17 is inserted into the pocket arrangement 20 (instead of the whole pad) so that the sheets of paper overlap the pocket arrangement 20 in an exposed position where they can be written upon. Another forwardly opening pocket arrangement 21 (FIG. 3) holds business cards. A padded reinforcing panel 22 within the upper leaf 18 adds some rigidity.

The side portion 16 of the device 11 has a size and shape adapted to extend downwardly from the top portion 15 alongside the armrest structure 12. The illustrated side portion 16 measures about seven inches high, and it encircles the armrest structure 12. At least one upwardly opening pocket arrangement 23 is provided on the side portion 16 for holding articles. The pocket arrangement 23 is illustrated in a position that faces the passenger seat 14. Preferably, additional pockets are provided, such as a pocket arrangement 24 facing the driver seat, and additional pockets facing forwardly and rearwardly may be included.

To use the accessory 10, the user simply installs it over the armrest structure 12, usually with the pad of paper 17 already inserted into the pocket arrangement 20. Then, the user places one or more articles in the pockets on the side portion 16. As a further idea of construction, the device 11 is fabricated from pieces of heavy cloth or canvas (e.g., automotive upholstery material) that are sewn together into the illustrated configuration. Elastic bands may be sewn into the pockets.

Now consider FIGS. 4–6. They show a second embodiment of the invention described in the parent application that is fabricated from pieces of synthetic leather automotive upholstery material that are sewn into the illustrated configuration. It is designated as an accessory 100. It is similar in many respects to the accessory 10 and so only differences are described in further detail. For convenience, some reference numerals designating parts of the accessory 100 are increased by one hundred over those designating related parts of the accessory 10.

One difference is that the accessory 100 includes three leafs 131, 132, and 133 instead of just two leafs. The lower or first leaf 131 (FIG. 5) includes a forwardly opening pocket arrangement 134 that is adapted to receive a lower tray component 135 (e.g., a rigid plate of metal or plastic). An upper tray component 136 is pivotally mounted on the lower tray component 135, and this arrangement serves as a laptop computer tray for supporting a laptop computer (not shown). The user secures the laptop computer on the upper tray component 136 by suitable means, using for example, a hook and loop fabric fastener such as that available under the trademark VELCRO.

The middle or second leaf 132 includes a pocket arrangement 120 for holding a pad of paper, and a pocket arrangement 121 for holding business cards. The second leaf 132 is adapted to be closed down over the first leaf 131 as depicted in FIG. 4. The upper or third leaf 133 is adapted to be closed down over the second leaf 132, and the lower or first leaf 131 is adapted to be moved from a closed position shown in FIG. 5 to an open position shown in FIG. 6. The open position exposes the interior 137 of an auxiliary box 137 on which the accessory 100 is installed. The open position also permits access to the interior of armrest structures of the type that have a compartment within.

Thus, the invention described in the parent application provides a vehicle accessory or valet in the form of a device that covers the armrest structure intermediate the driver and passenger to provide pockets for holding various personal items and a pad of paper. One embodiment includes a holder for a laptop computer, and an auxiliary box is provided to support the valet intermediate the left and right backseats.

Portable Laptop Computer Workstation

Figure 8:
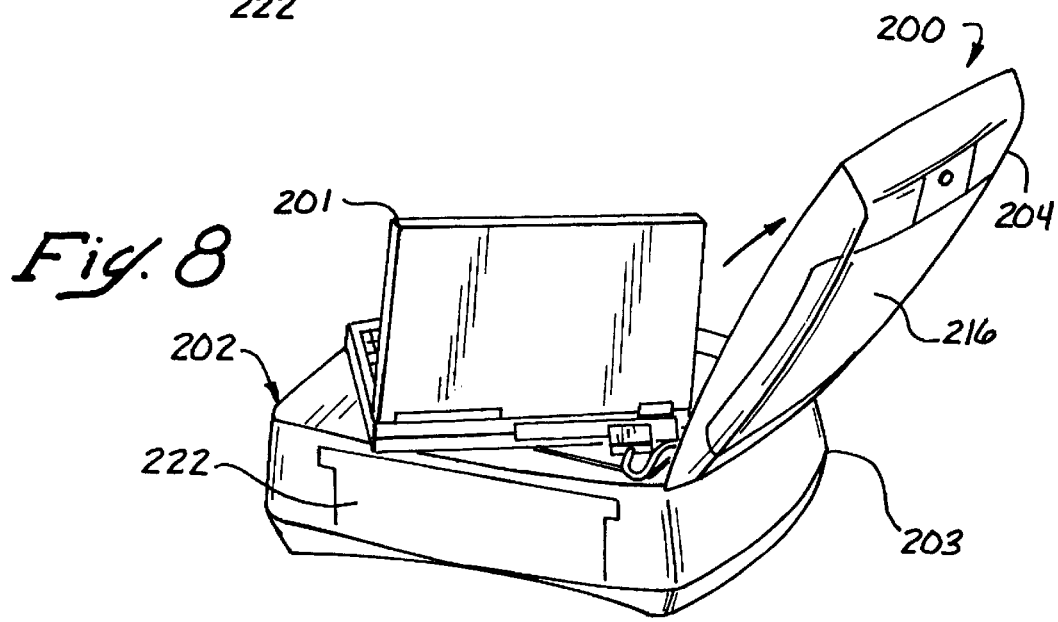
FIG. 8 is another view similar to FIG. 7, but with the top portion opened to expose a laptop computer mounted on the laptop computer support structure.
Figure 9:
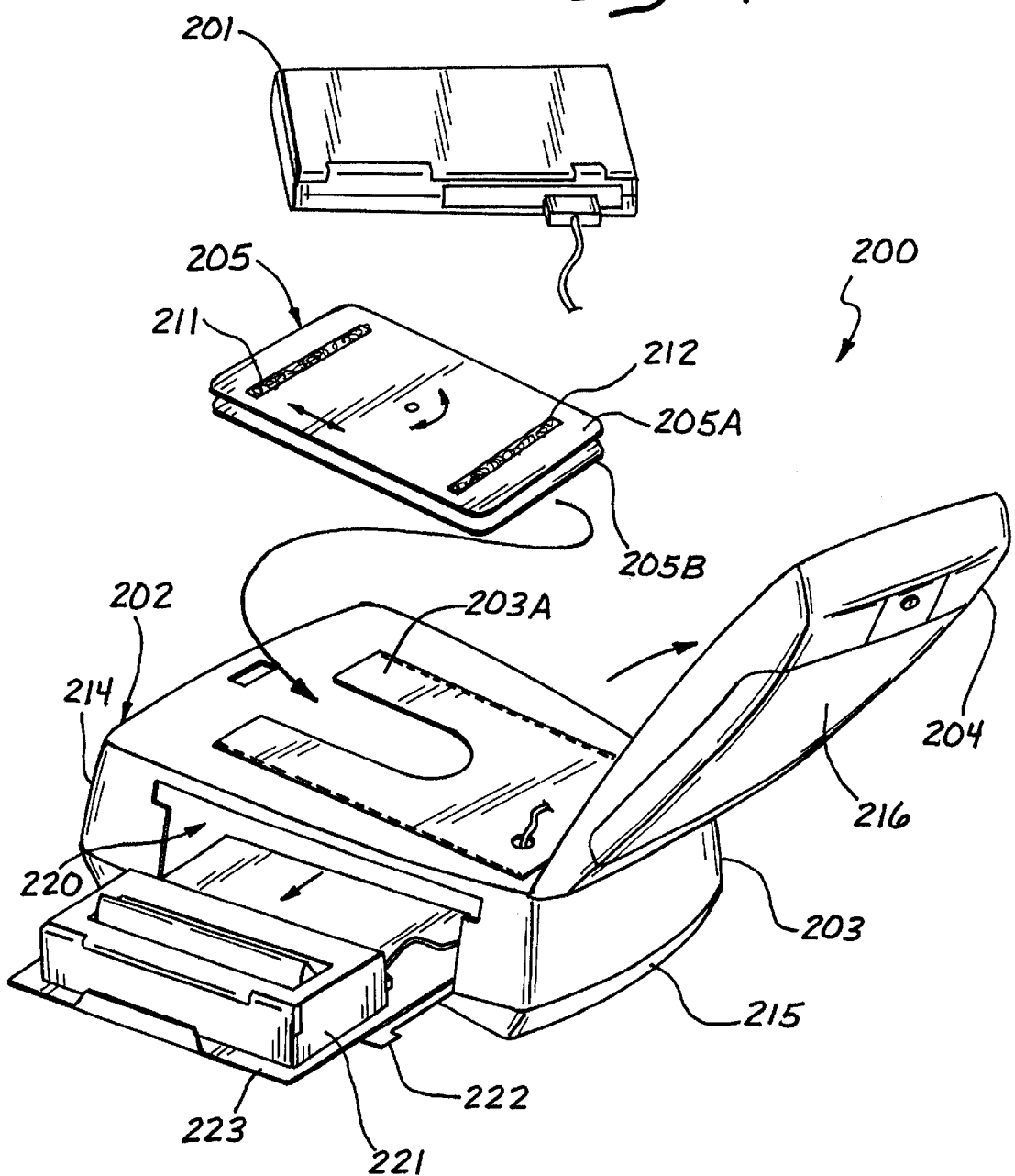
FIG. 9 is a partially disassembled view taken from the passenger's side showing laptop computer mounting details, and a printer drawer.

FIGS. 7–12 illustrate various aspects of an accessory constructed according to the invention that is subsequently referred to herein as a workstation 200. Similar in some respects to the accessory 10 of the parent application, the workstation 200 of this continuation-in-part application is designed to hold and cover a laptop computer 201 (FIGS. 8 and 9). For that purpose, it includes a molded plastic case 202 (FIGS. 7, 8, 9, 11, and 12) with a lower portion 203 and an upper portion 204, the upper portion 204 being hinged to the lower portion 203. The case 202 has a size and shape and functional attributes adapted to hold the laptop computer 201 upon the front seat of an automobile in a position located to the right of a driver occupying a driver's seat in the automobile.

The lower portion 203 includes a support structure 205 (FIGS. 9 and 10) that is adapted to hold the laptop computer 201 pivotally in order to enable the driver to pivot the laptop computer 201 relative to the lower portion 203 to a desired operating position of the laptop computer 201 (facing the driver as depicted in FIG. 8). The upper portion 204 is hinged to the lower portion 203 by suitable means in order to enable a driver to move the upper portion 204 between a closed position of the upper portion 204 in which the upper portion 204 covers the laptop computer 201 on the support structure 205 (FIGS. 7, 11, and 12) and an open position of the upper portion 204 in which the upper portion 204 exposes the laptop computer 201 on the support structure 205 to the driver (FIGS. 8 and 9).

Figure 10:
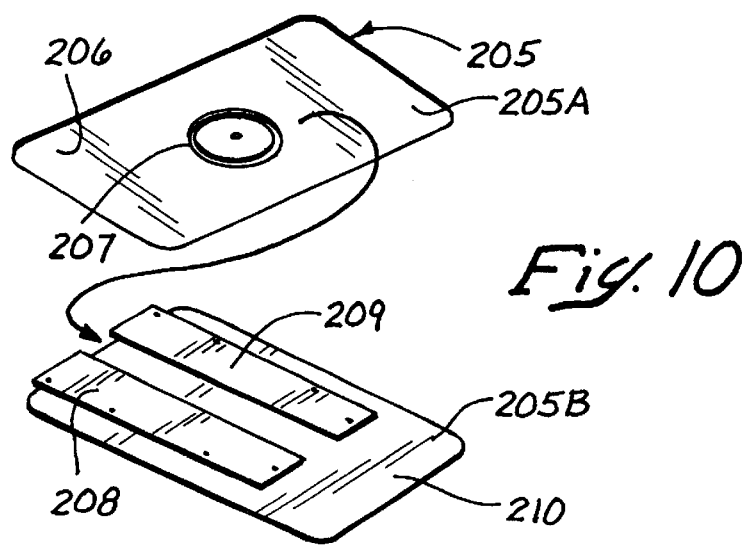
FIG. 10 is a view of the top and bottom plates that form the laptop computer support structure.

The support structure 205 is similar to the laptop computer tray previously described for the accessory 100 in FIG. 5 that has an upper tray component 136 and lower tray component 135. As illustrated in FIGS. 9 and 10, the support structure 205 includes an upper tray component 205A and a lower tray component 205B (rigid metal or plastic). The upper tray component 205A includes a plate 206 with a protrusion 207 that fits pivotally between two rails 208 and 209 on a plate 210 of the lower tray component 205B (FIG. 10). With the upper portion 204 pivoted to the open position illustrated in FIG. 9, the plate 210 is inserted into a pocket structure 203A on the lower portion 203 of the case 202.

The laptop computer 201 represents any of various commercially available laptop computer models, and it is attached to an upper tray component 205A of the support structure 205 by strips 211 and 212 of hook-and-loop fabric fastener (VELCRO) or other suitable means (FIG. 9). The upper portion 204 is then pivoted to the closed position illustrated in FIGS. 7, 11, and 12. It can be locked in the closed position with a lock arrangement 213 that is visible in FIGS. 7 and 11. A key type lock is illustrated, but any of various suitable known locking arrangements may be employed.

As a further idea of size, the case 202 measures about twelve inches in overall height, about fourteen inches wide, and about eighteen inches from a rearward end 214 of the case 202 (identified in FIGS. 9 and 12) to a forward end 215. When in position on the seat of an automobile, the rearward end 214 faces toward the rear of the vehicle and the forward end 215 faces toward the front of the vehicle. By opening a lid 216 that is part of the upper portion 204 as depicted by the arrow in FIG. 12, the driver exposes a pad 217 of writing paper that is held upon the underside 218 of the lid 216 by suitable means (e.g., a flap or pocket). The lid 216 holds the pad 217 in a convenient writing position for the driver. The pad 217 faces downwardly toward the laptop computer 201 on the support structure 205 when the lid 216 is in the closed position illustrated in FIG. 11, and it faces upwardly and rearwardly when the lid 216 is in the open position illustrated in FIG. 12. Opening the lid 216 also exposes a storage compartment 219 defined by the upper portion 204 of the case 202 (FIG. 12).

In addition to the foregoing, the lower portion 203 of the illustrated case 202 defines a second compartment 220 that is adapted to hold a computer printer 221 (FIG. 9). The lower portion 203 includes a movable side panel 222 for covering the compartment 220 (FIGS. 7, 8, and 9) and a movable printer support structure 223 (FIG. 9) adapted to hold the printer 221 within the compartment 220 while enabling the driver to move the printer 221 on the printer support structure 223 out of the compartment 220 toward the passenger seat to the right of the driver's seat. The printer support structure 223 can be a pivotable plate arrangement similar to the support structure 205 described previously that supports the laptop computer 201.

Figure 11:
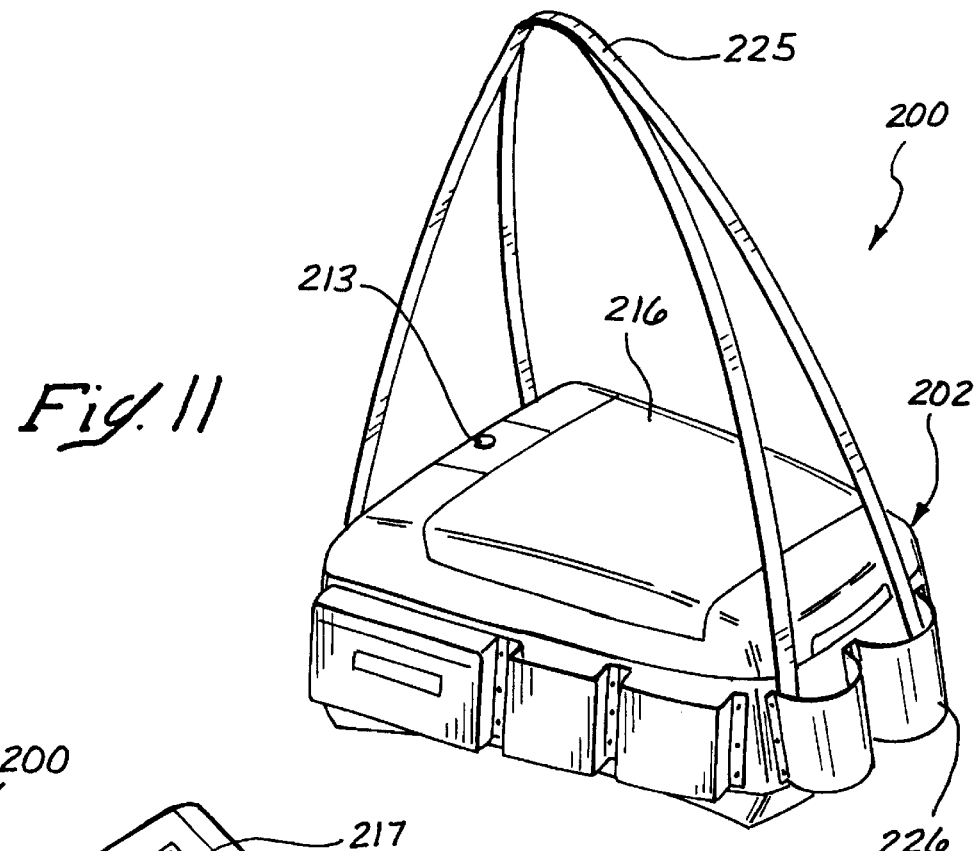
FIG. 11 is view taken from the passenger's side showing addition of a carrier harness.
Figure 12:
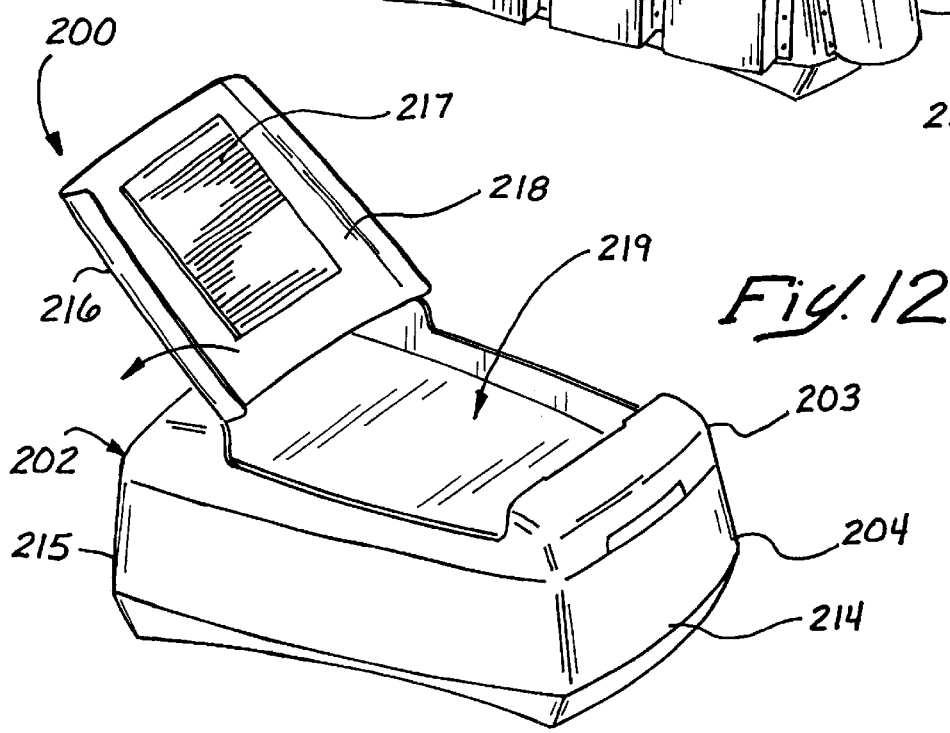
FIG. 12 is a view taken from the driver's side of the workstation showing details of a secondary cover, storage compartment, and placement of a pad of writing paper in the top portion.

FIG. 11 shows a carrier harness 224 that fits tightly around the case 202. It includes a shoulder strap arrangement 225 that the driver can use to transport the workstation 200 to and from the automobile. An assortment of pockets are included on the harness for holding various articles. Only one pocket 226 is designated in FIG. 11 for illustrative convenience. It is adapted to hold a beverage container.

Thus, the embodiment described in the instant continuation-in-part application extends the inventive concepts described in the parent application to provide a functional laptop computer workstation 200 that is particularly suited for use in patrol cars and emergency vehicles in addition to its intended use in civilian vehicles. Although an exemplary embodiment has been shown and described, one of ordinary skill in the art may make many changes, modifications, and substitutions without necessarily departing from the spirit and scope of the invention.

What is claimed is:

1. An accessory for an automobile, comprising:
   a case adapted to hold a laptop computer upon the front seat of an automobile in a position located to the right of a driver occupying a driver's seat in the automobile;
   a lower portion of the case, the lower portion including a support structure adapted to hold the laptop computer pivotally in order to enable the driver to pivot the laptop computer relative to the lower portion of the case to a desired operating position of the laptop computer; and
   an upper portion of the case that is hinged to the lower portion in order to enable the driver to move the upper portion between a closed position of the upper portion in which the upper portion covers the laptop computer on the support structure and an open position of the upper portion in which the upper portion exposes the laptop computer on the support structure to the driver;
   wherein the lower portion of the case includes a pocket structure;
   wherein the support structure adapted to hold the laptop computer pivotally includes a first tray component that is adapted to fit within the pocket structure and a second tray component attached pivotally to the first tray component that is adapted to hold the laptop computer;
   wherein the lower portion of the case defines a compartment adapted to hold a computer printer; and
   wherein the lower portion includes a movable side panel for covering the compartment and a movable printer support structure adapted to hold a printer within the compartment while enabling the driver to move the printer on the printer support structure out of the compartment toward a passenger seat to the right of the driver's seat.

2. An accessory as recited in claim 1, wherein the upper portion of the case is adapted to hold a pad of writing paper so that the pad of writing paper faces downwardly toward the laptop computer on the support structure when the upper portion is in the closed position and so that the pad of writing paper faces upwardly and rearwardly when the upper portion is in the open position.

3. An accessory as recited in claim 1, wherein the upper portion of the case defines an upwardly opening storage compartment and the upper portion includes a movable cover over the storage compartment.

4. An accessory as recited in claim 3, wherein the movable cover is adapted to hold a pad of writing paper so that the pad of writing paper faces downwardly toward the laptop computer on the support structure when the cover is in a closed position over the storage compartment and so that the pad of writing paper faces upwardly and rearwardly when the cover is in an open position.

5. An accessory as recited in claim 1, further comprising means for locking the upper portion of the case in the closed position.

6. An accessory, comprising:
   a case adapted to hold a laptop computer upon the front seat of an automobile in a position located to the right of a driver occupying a driver's seat in the automobile;
   a lower portion of the case, the lower portion including a support structure adapted to hold the laptop computer pivotally in order to enable the driver to pivot the laptop computer relative to the lower portion of the case to a desired operating position of the laptop computer; and an upper portion of the case that is hinged to the lower portion in order to enable the driver to move the upper portion between a closed position of the upper portion in which the upper portion covers the laptop computer on the support structure and an open position of the upper portion in which the upper portion exposes the laptop computer on the support structure to the driver and;

a carrier harness with shoulder straps for facilitating transportation of the accessory to and from the automobile;

wherein the lower portion of the case includes a pocket structure;

wherein the support structure adapted to hold the laptop computer pivotally includes a first tray component that is adapted to fit within the pocket structure and a second tray component attached pivotally to the first tray component that is adapted to hold the laptop computer; and wherein the carrier harness includes a plurality of upwardly opening pockets for holding articles.

7. An accessory for an automobile, comprising:

a case having a lower portion adapted to hold a laptop computer upon the front seat of an automobile in a position located to the right of a driver occupying a driver's seat in the automobile; and an upper portion of the case that is hinged to the lower portion in order to enable the driver to move the upper portion between a closed position of the upper portion in which the upper portion covers the laptop computer on the support structure and an open position of the upper portion in which the upper portion exposes the laptop computer on the support structure to the driver;

wherein the lower portion of the case defines a compartment adapted to hold a computer printer; and wherein the lower portion includes a movable side panel for covering the compartment and a movable printer support structure adapted to hold a printer within the compartment while enabling the driver to move the printer on the printer support structure out of the compartment toward a passenger seat to the right of the driver's seat.

* * * * *